(12) United States Patent
Iwano

(10) Patent No.: US 11,222,526 B2
(45) Date of Patent: Jan. 11, 2022

(54) TWO-WIRE TRANSMITTER

(71) Applicant: YOKOGAWA ELECTRIC CORPORATION, Musashino (JP)

(72) Inventor: Youichi Iwano, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/720,650

(22) Filed: Dec. 19, 2019

(65) Prior Publication Data

US 2020/0202701 A1    Jun. 25, 2020

(30) Foreign Application Priority Data

Dec. 25, 2018   (JP) .............................. JP2018-241573

(51) Int. Cl.
*G08C 19/02* (2006.01)
*H04B 3/00* (2006.01)

(52) U.S. Cl.
CPC ............... *G08C 19/02* (2013.01); *H04B 3/00* (2013.01)

(58) Field of Classification Search
CPC .......... G08C 19/02; G08C 19/00; H04B 3/00; H02J 4/00
See application file for complete search history.

(56) References Cited

U.S. PATENT DOCUMENTS

| 6,140,940 | A | 10/2000 | Klofer et al. | |
| 8,718,152 | B2* | 5/2014 | Iwano | G08C 19/02 |
| | | | | 375/259 |
| 10,256,830 | B2* | 4/2019 | Simon | H03M 1/66 |
| 2007/0194210 | A1* | 8/2007 | Lee | H03F 3/08 |
| | | | | 250/214 R |
| 2013/0271156 | A1* | 10/2013 | Schleith | G01D 5/12 |
| | | | | 324/609 |
| 2018/0097439 | A1* | 4/2018 | Maki | H02M 1/32 |
| 2021/0088991 | A1* | 3/2021 | Strutt | G05B 19/41845 |

FOREIGN PATENT DOCUMENTS

| CN | 102447389 A | 5/2012 |
| JP | 2011-513877 A | 4/2011 |
| JP | 2012-053819 A | 3/2012 |
| JP | 2012-99088 A | 5/2012 |
| JP | 2013-025772 A | 2/2013 |
| JP | 2013-178107 A | 9/2013 |
| WO | 2009/114064 A1 | 9/2009 |

* cited by examiner

*Primary Examiner* — Sophia Vlahos

(74) *Attorney, Agent, or Firm* — Westerman, Hattori, Daniels & Adrian, LLP

(57) ABSTRACT

A two-wire transmitter is connected to an external circuit via two transmission lines and outputs a current signal to the external circuit while using the external circuit as a power source. The two-wire transmitter includes: a measured data processing circuit that is connected to a sensor that outputs an electrical signal based on measured data and configured to output a first signal based on the measured data; a current output circuit configured to determine a current signal based on the first signal; and a shunt regulator circuit configured to determine a circuit voltage of the two-wire transmitter based on the first signal.

8 Claims, 8 Drawing Sheets

1

TWO-WIRE TRANSMITTER

CROSS REFERENCE TO RELATED APPLICATION

This application claims priority to and the benefit of Japanese Patent Application No. 2018-241573 (filed on Dec. 25, 2018), the entire contents of which are incorporated herein by reference.

TECHNICAL FIELD

The present disclosure relates to a two-wire transmitter.

BACKGROUND

Two-wire transmitters that output a predetermined current signal to an external circuit based on a signal acquired from a sensor are conventionally known (e.g., see PTL 1).

CITATION LIST

Patent Literature

PTL 1: JP-A-2012-99088

SUMMARY

A two-wire transmitter according to some embodiments is connected to an external circuit via two transmission lines and outputs a current signal to the external circuit while using the external circuit as a power source. The two-wire transmitter includes a measured data processing circuit, a current output circuit, and a shunt regulator circuit. The measured data processing circuit is connected to a sensor that outputs an electrical signal based on measured data, and outputs a first signal based on the measured data. The current output circuit determines the current signal based on the first signal. The shunt regulator circuit determines a circuit voltage of the two-wire transmitter based on the first signal.

DETAILED DESCRIPTION

Figure 1:
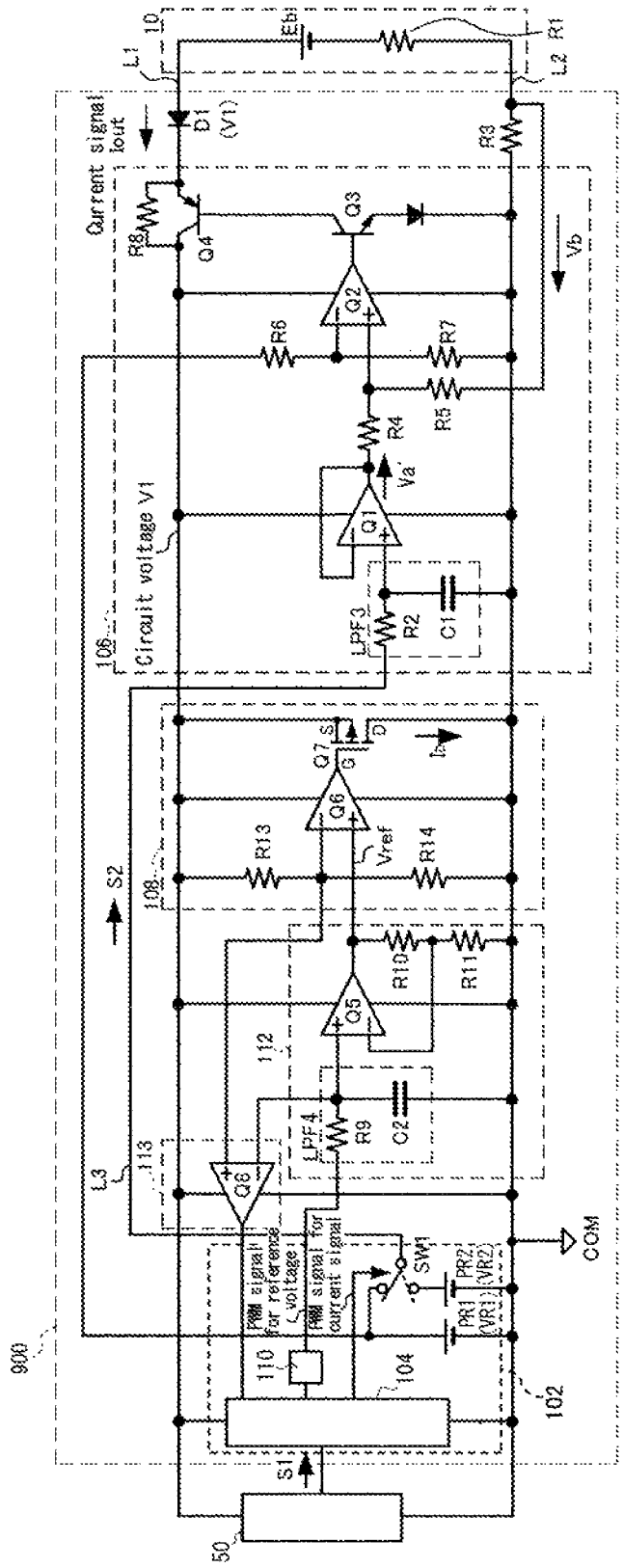
FIG. 1 is a circuit diagram illustrating a two-wire transmitter according to a comparative example.

When a two-wire transmitter includes a shunt regulator circuit, the shunt regulator circuit controls a circuit voltage to be applied to the two-wire transmitter based on a change in a current signal output to an external circuit. A stable control of the circuit voltage is necessary.

A two-wire transmitter according to some embodiments is a two-wire transmitter that is connected to an external circuit via two transmission lines and outputs a current signal to the external circuit while using the external circuit as a power source. The two-wire transmitter includes a measured data processing circuit, a current output circuit, and a shunt regulator circuit. The measured data processing circuit is connected to a sensor that outputs an electrical signal based on measured data. The current output circuit determines the current signal based on the first signal. The shunt regulator circuit determines a circuit voltage of the two-wire transmitter based on the first signal. Because both the current output circuit and the shunt regulator circuit operate based on the first signal as described above, a deviation in timing at which a signal is input to each circuit is reduced. As a result, operational stability is improved.

In the two-wire transmitter according to an embodiment, the more the current output circuit reduces the current flowing as the current signal based on the first signal, the more the shunt regulator circuit can increase the circuit voltage based on the first signal. In this way, the electric power supplied to the two-wire transmitter is secured. As a result, operational stability is improved.

In the two-wire transmitter according to an embodiment, the measured data processing circuit may include a signal processing circuit configured to processes the electrical signal and output a control signal, and a first signal generation circuit configured to output a first signal based on the control signal. Thus, the current output circuit can output an electrical signal based on the measured data. As a result, operational stability is improved.

In the two-wire transmitter according to an embodiment, the control signal may include a PWM signal controlled based on a PWM method, and the first signal generation circuit may include an LPF and convert the PWM signal into the first signal. In this way, the current output circuit can output a current signal based on the measured data. As a result, operational stability is improved.

In the two-wire transmitter according to an embodiment, the control signal may include a digital signal, and the first signal generation circuit may include a DA converter, convert the digital signal into an analog signal, and output the analog signal as the first signal. This reduces the number of constituent elements. As a result, a constituent element mounting area is reduced, or cost reduction is realized, and operation stability is improved.

In the two-wire transmitter according to an embodiment, the measured data processing circuit may include an abnormal state detection circuit. Thus, when the signal processing circuit enters an abnormal state, burnout of the current signal output from the signal output circuit can be performed in accordance with the abnormal state.

The present disclosure provides a two-wire transmitter that can improve operational stability.

A two-wire transmitter 900 according to a comparative example is connected to an external circuit 10 via two transmission lines L1 and L2, as illustrated in FIG. 1. The two-wire transmitter 900 operates on electric power supplied from the external circuit 10. That is, the two-wire transmitter 900 operates using the external circuit 10 as a power source. The external circuit 10 includes a voltage source Eb and a resistor R1. The voltage source Eb and the resistor R1 are connected in series with the transmission lines L1 and L2. The two-wire transmitter 900 draws a current represented by Iout from a transmission line L1 via a diode D1, flows the current represented by Iout to a transmission line L2 via a resistor R3, and thus outputs the current signal Iout to the external circuit 10.

The two-wire transmitter 900 according to the comparative example is connected to a sensor 50. The two-wire transmitter 900 acquires measured data from the sensor 50. The sensor 50 operates on electric power supplied from the two-wire transmitter 900. The sensor 50 measures a physical quantity such as a pressure or temperature, converts the measured data into a measurement signal S1, and then outputs the measurement signal S1 to the two-wire transmitter 900.

The two-wire transmitter 900 according to the comparative example includes a measured data processing circuit 102, a current output circuit 106, and a shunt regulator circuit 108.

The measured data processing circuit 102 includes a signal processing circuit 104. The signal processing circuit 104 acquires the measurement signal S1 from the sensor 50 and executes predetermined processing, such as linearity correction, on the measurement signal S1. The signal processing circuit 104 modulates the measurement signal S1 subjected to the predetermined processing employing a pulse width modulation method and outputs thus obtained modulated signal to a switch SW1 as a switching control signal. A signal modulated by the pulse width modulation method is also referred to as a PWM (Pulse Width Modulation) signal. The PWM signal output to the switch SW1 is referred to as a current signal PWM signal. The switch SW1 has two fixed contacts and one movable contact. One of the fixed contacts of the switch SW1 is connected to a first reference voltage source PR1 that outputs a voltage represented by VR1. The other one of the fixed contacts of the switch SW1 is connected to a second reference voltage source PR2 that outputs a voltage represented by VR2. The movable contact of the switch SW1 is connected to a signal line L3. The connection destination of the movable contact of the switch SW1 is switched between the two fixed contacts in accordance with a change in the voltage level of the input current signal PWM signal. Thus, the measured data processing circuit 102 outputs a signal whose voltage changes between VR1 and VR2 to the signal line L3 as a signal S2.

The current output circuit 106 determines a value of the current signal output to be the external circuit 10 based on the signal S2 input through the signal line L3. The current signal Iout is represented by a current between 4 mA and 20 mA. The current output circuit 106 includes an LPF (Low Pass Filter) 3, a buffer amplifier Q1, an error amplifier Q2, and transistors Q3 and Q4. A resistor R8 is connected in parallel to an emitter and a collector of the transistor Q4. The two-wire transmitter 900 can be activated by power supplied from the external circuit 10 via the resistor R8. The LPF 3 includes a resistor R2 and a capacitor C1 and performs denoising on the signal S2. The buffer amplifier Q1 buffers the smoothed signal S2 and outputs it as a signal Va'. The voltage of the transmission line L2 is represented by Vb. The error amplifier Q2 detects an error between the voltage obtained by separating a potential difference between the signal Va' and the voltage Vb using resistors R4 and R5 and the voltage obtained by separating a voltage VR1 output by the first reference voltage source PR1 using resistors R6 and R7, and controls currents flowing through the transistors Q3 and Q4 to match the voltages. The current drawn from the external circuit 10 by the transistor Q4 becomes a current signal Iout corresponding to the measurement signal S1 output from the sensor 50. Normally, the current signal Iout is determined to be 4 mA when the measurement result of the sensor 50 is 0% with respect to a set span, or 20 mA when the measurement result is 100%. The smaller the measurement signal S1 output from the sensor 50, the smaller the current signal Iout.

The measured data processing circuit 102 further includes a reference voltage output unit 110. The signal processing circuit 104 outputs an electrical signal corresponding to the measurement signal S1 acquired from the sensor 50 to the reference voltage output unit 110.

The two-wire transmitter 900 according to the comparative example further includes a reference voltage processing circuit 112. The reference voltage output unit 110 outputs a reference voltage to the reference voltage processing circuit 112 according to the electrical signal input from the signal processing circuit 104. The reference voltage output unit 110 employs a PWM signal as a reference voltage signal representing the reference voltage. The PWM signal representing the reference voltage is referred to as a reference voltage PWM signal. The smaller the electrical signal input from the signal processing circuit 104, that is, the smaller the measured signal S1 output from the sensor 50, the higher a duty ratio of the reference voltage PWM signal output by the reference voltage output unit 110. The larger the electrical signal input from the signal processing circuit 104, that is, the larger the measured signal S1 output from the sensor 50, the lower the duty ratio of the reference voltage PWM signal output by the reference voltage output unit 110. Here, when the measurement signal S1 output from the sensor 50 is small, the current signal Iout has a small value such as, for example, 4 mA.

The reference voltage processing circuit 112 includes an LPF4, an error amplifier Q5, and resistors R10 and R11. The LPF4 has a resistor R9 and a capacitor C2. The reference voltage processing circuit 112 performs denoising on the reference voltage PWM signal using the LPF 4, performs negative feedback amplification using the error amplifier Q5 and the resistors R10 and R11, and then outputs an output Vref to the shunt regulator circuit 108.

The shunt regulator circuit 108 includes an error amplifier Q6, a transistor Q7, and resistors R13 and R14. The error amplifier Q6 detects an error between the output Vref of the error amplifier Q5 and the voltage obtained by separating the circuit voltage V1 applied to the circuit using the resistor R13 and a resistor R14, and controls to match the output Vref and the voltage. A drain current of transistor Q7 is represented by ID. The circuit voltage V1 corresponds to a voltage applied between the ground line and the power supply line. The ground line is a wire connected to a ground point represented by a COM. The voltage of the ground line is also referred to as a ground voltage or a COM voltage. The power supply line is a wiring connected to the transmission line L1 via the diode D1 and the transistor Q4 or the resistor R8.

The above operation increases the circuit voltage V1 when the current flowing from the external circuit 10 into the two-wire transmitter 900 is small due to a small value of the current signal Iout. This increases the electric power that can be consumed within the two-wire transmitter 900. When a DC-DC converter using the circuit voltage V1 as an input voltage is used, a current that can be used on the output side (a secondary side) of the DC-DC converter is increased.

The two-wire transmitter 900 according to the comparative example further includes a comparator circuit 113. The comparator circuit 113 includes a comparator Q8. A voltage obtained by smoothing the reference voltage PWM signal using the LPF 4 is input to an inverting input terminal of the comparator Q8. A voltage obtained by separating the circuit voltage V1 using the resistor R13 and the resistor R14 is input to a non-inverting input terminal of the comparator Q8. The comparator Q8 compares these voltages and, when the voltage input to the non-inverting input terminal decreases, that is, when the circuit voltage V1 decreases, notifies the signal processing circuit 104 of the abnormality by inverting the voltage output to the signal processing circuit 104. When the signal processing circuit 104 detects the inverted voltage input from the comparator Q8, the signal processing circuit 104 performs processing such as saving the current value of the measurement signal S1.

As described above, in the two-wire transmitter 900 according to the comparative example, the smaller the measurement signal S1 input from the sensor 50, the higher the duty ratio of the reference voltage PWM signal the reference voltage output unit 110 outputs as the measurement signal S1. Thus, the smaller the measurement signal S1 input from the sensor 50, the higher the circuit voltage V1 controlled by the shunt regulator circuit 108. That is, when the current signal Iout corresponding to the current supplied from the external circuit 10 is small, the circuit voltage V1 is increased. As a result, the electric power that can be consumed within the circuit of the two-wire transmitter 900 increases.

In the two-wire transmitter 900 according to the comparative example, transient response characteristics of the LPF3 that outputs a signal to the current output circuit 106 and transient response characteristics of the LPF4 that outputs a signal to the shunt regulator circuit 108 may be different from each other. When the transient response characteristics of the LPF 3 and that of the LPF 4 are different from each other, there is a probability that the current output circuit 106 or the shunt regulator circuit 108 operates in an unexpected manner.

For example, when the transient response of LPF 3 is faster than the transient response of LPF 4, the change of the current signal by the current output circuit 106 is faster than the change of the circuit voltage V1 by the shunt regulator circuit 108.

When the current output circuit 106 increases the current signal, the voltage drop at the resistors R1 and R3 increases due to the increase in the current signal. As the voltage drop across the resistor increases, an emitter voltage of transistor Q4 decreases. On the other hand, because the transient response of LPF4 is slower than the transient response of LPF3, the circuit voltage V1 is controlled to be high. Because the circuit voltage V1 remains high, the voltage between the collector and the emitter of the transistor Q4 becomes small. Because the voltage between the collector and the emitter becomes small, the transistor Q4 is saturated. When the transistor Q4 is saturated, a collector current of the transistor Q4 hardly increases. When the current output circuit 106 increases the current signal by increasing the collector current of the transistor Q4, the output voltage of the error amplifier Q2 is increased, the collector current of the transistor Q3 is increased, and the base current of the transistor Q4 is increased. However, the collector current of the transistor Q3 may not be sufficiently increased due to an upper limit of the output voltage of the error amplifier Q2. As a result, the magnitude of the current signal to be output based on the measured data may not be secured.

When the current output circuit 106 reduces the current signal, the speed at which the circuit voltage V1 increases is slower than the speed at which the current signal decreases. That is, when the current signal becomes small, there is a probability that the circuit voltage V1 remains small. In this case, the power supplied to each circuit of the two-wire transmitter 900 decreases. As a result, the two-wire transmitter 900 may enter an operation stop (reset) state.

For example, when the transient response of LPF 3 is slower than the transient response of LPF 4, the change of the current signal by the current output circuit 106 is slower than the change of the circuit voltage V1 by the shunt regulator circuit 108. When the current output circuit 106 attempts to increase the current signal, the circuit voltage V1 may decrease first. In this case, electrical power supplied to each circuit of the two-wire transmitter 900 decreases. As a result, the two-wire transmitter 900 may enter the operation stop (reset) state. When the current output circuit 106 attempts to reduce the current signal, the circuit voltage V1 may increase first. In this case, the transistor Q4 may become saturated. As a result, the collector current of the transistor Q4 may not be sufficiently increased, and the magnitude of the current signal to be output based on the measured data may not be secured.

The two-wire transmitter 900 according to the comparative example may behave in an unexpected manner at the time of activation. At the time of activation, the circuit voltage V1 applied to the two-wire transmitter 900 increases with time. When the error amplifier Q5 is not operating while the circuit voltage V1 is increasing, the output of the error amplifier Q5 has a high impedance. In this case, the output of the error amplifier Q5 is pulled down to the COM voltage by the resistors R10 and R11. In this state, the COM voltage is input to a non-inverting input terminal of the error amplifier Q6 included in the shunt regulator circuit 108. The voltage at an inverting input terminal of the error amplifier Q6 is higher than the COM voltage by the voltage applied to the resistor R14 and thus higher than the voltage at the non-inverting input terminal. In this state, when the error amplifier Q6 operates first, the error amplifier Q6 outputs a COM voltage. When the error amplifier Q6 outputs the COM voltage, the COM voltage is input to a gate of the transistor Q7. When the gate and a drain of the transistor Q7 have the same COM voltage, the transistor Q7 is turned on. When the transistor Q7 is turned on, the current input to the two-wire transmitter 900 flows through the transistor Q7 and does not easily flow through other circuits. As a result of that the current does not easily flow through circuits other than the transistor Q7, activation of the two-wire transmitter 900 may be failed.

Thus, the present disclosure describes a two-wire transmitter that enables a circuit to operate in an expected manner even when there is an error in circuit parameters, such as different transient response characteristics between two LPFs.

Embodiment of Present Disclosure

Figure 2:
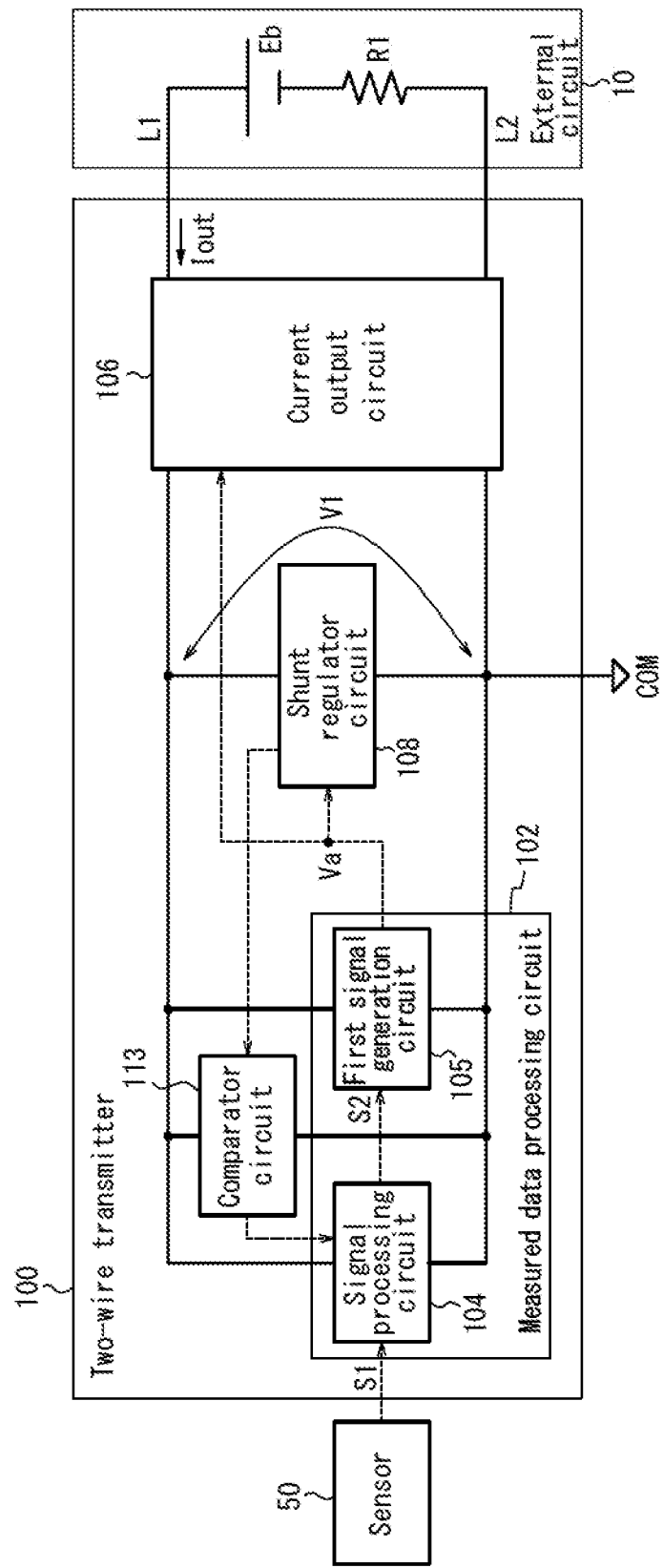
FIG. 2 is a block diagram illustrating an example configuration of a two-wire transmitter according to an embodiment.

The two-wire transmitter 100 according to an embodiment includes a measured data processing circuit 102, a current output circuit 106, and a shunt regulator circuit 108, as illustrated in FIG. 2. The two-wire transmitter 100 may further include a comparator circuit 113. The measured data processing circuit 102 may include a signal processing circuit 104 and a first signal generation circuit 105.

In FIG. 2, solid lines represent an electrical wiring for receiving electric power supply from the external circuit 10. The external circuit 10 includes a voltage source Eb and a resistor R1. The voltage source Eb and the resistor R1 are connected in series with transmission lines L1 and L2. The two-wire transmitter 100 operates on electric power supplied from the external circuit 10. That is, the two-wire transmitter 100 operates using the external circuit 10 as a power source.

The current output circuit 106 draws a current corresponding to a current signal Iout from the external circuit 10. The current output circuit 106 generates the current signal Iout to be output to the external circuit 10 by controlling the magnitude of the drawn current. The current signal Iout is represented by a current between 4 mA and 20 mA. The current signal Iout may be represented by different current values. The external circuit 10 can acquire information from the two-wire transmitter 100 based on the current signal Iout. The shunt regulator circuit 108 determines a circuit voltage V1 to be applied to each constituent element of the two-wire transmitter 100. The signal processing circuit 104, the first signal generation circuit 105, and the comparator circuit 113 may operate at the circuit voltage V1 determined by the shunt regulator circuit 108, or at the circuit voltage V1 stepped down by a step-down power supply IC (Integrated Circuit) or the like. The electric power supplied to each constituent element of the two-wire transmitter 100 is determined based on the circuit voltage V1.

The sensor 50 measures a physical quantity such as a pressure or temperature, converts the measured data into an electrical signal, and outputs the electrical signal to the two-wire transmitter 100. The sensor 50 may operate on the electric power supplied from the two-wire transmitter 100. The sensor 50 may operate on electric power supplied from a power source other than the two-wire transmitter 100.

In FIG. 2, the broken lines represent the signal flow between each constituent elements. The signal processing circuit 104 acquires an electrical signal based on the measured data from the sensor 50. The electrical signal based on the measured data is also called a measurement signal. The measurement signal acquired by the signal processing circuit 104 from the sensor 50 is represented by S1. The signal processing circuit 104 outputs a signal based on the measurement signal to the first signal generation circuit 105. The signal based on the measurement signal is represented by S2. The first signal generation circuit 105 generates a first signal Va based on the signal acquired from the signal processing circuit 104. That is, the measured data processing circuit 102 generates the first signal Va based on the measured data. The measured data processing circuit 102 outputs the first signal Va to the current output circuit 106 and the shunt regulator circuit 108. The current output circuit 106 determines the current signal Iout based on the input first signal Va. Normally, the current signal Iout is determined to be 4 mA when the measurement result of the sensor 50 is 0% with respect to the set span, or 20 mA when the measurement result is 100%. The smaller the measurement signal output from the sensor 50, the smaller the current signal Iout. The shunt regulator circuit 108 determines the circuit voltage V1 based on the input first signal Va. The circuit voltage V1 corresponds to a voltage applied between the ground line and the power supply line. The ground wire is a wire connected to a ground point represented by a COM. The voltage of the ground line is also referred to as a ground voltage or a COM voltage. The ground line is a wiring connected to the transmission line L2. The power supply line is a wiring connected to the transmission line L1 via the current output circuit 106. The external circuit 10 supplies electric power to the two-wire transmitter 100 via the power supply line. The shunt regulator circuit 108 outputs a signal based on the circuit voltage V1 to the comparator circuit 113. The comparator circuit 113 generates a signal indicating whether the circuit voltage V1 is in an abnormal state based on the signal acquired from the shunt regulator circuit 108, and outputs the signal to the signal processing circuit 104.

The operation of the measured data processing circuit 102 will be described with reference to FIG. 3.

Figure 3:
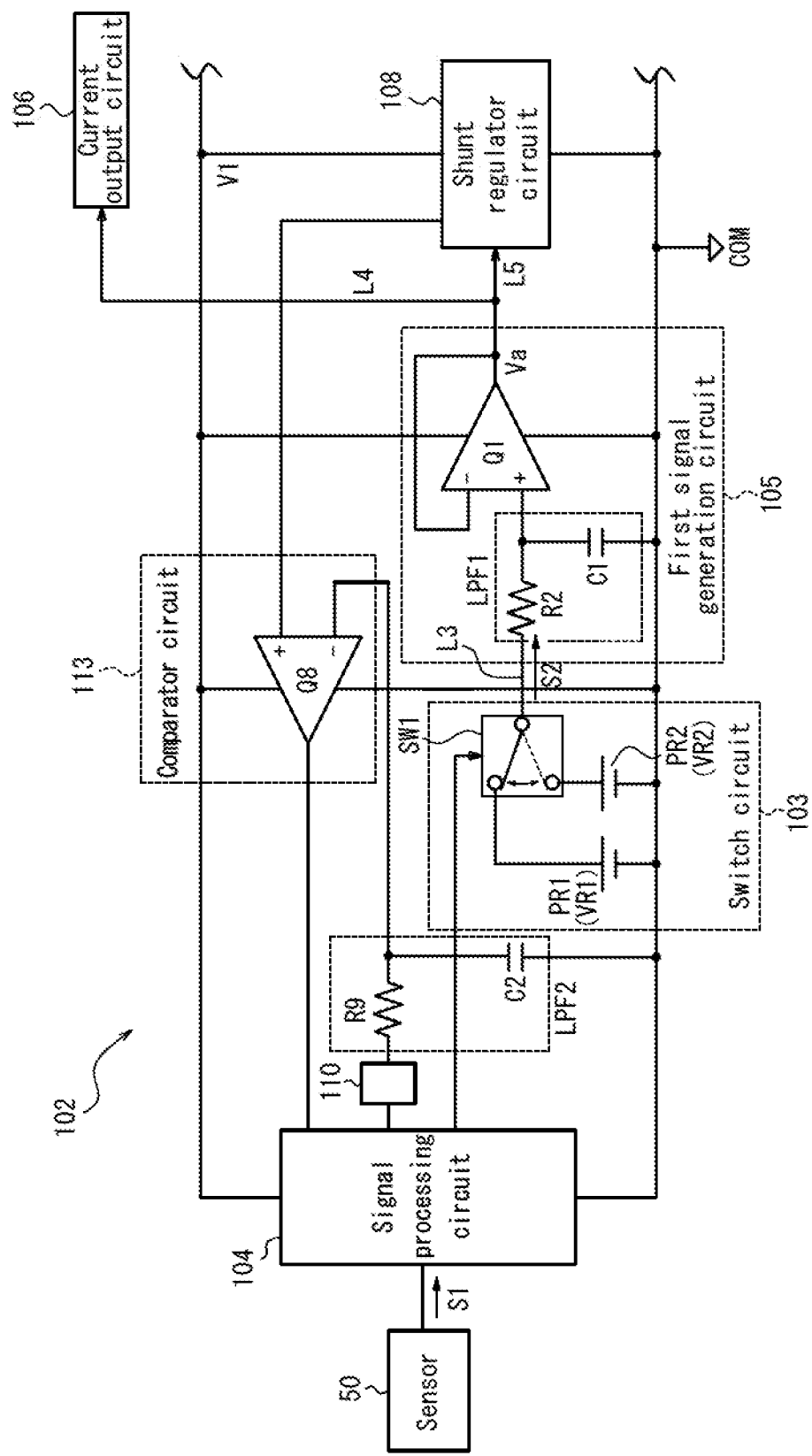
FIG. 3 is a circuit diagram illustrating an example configuration of a measured data processing circuit.

The two-wire transmitter 100 can be connected to the sensor 50 by the measured data processing circuit 102, and is connected to the sensor 50 in FIG. 3. The two-wire transmitter 100 acquires measured data from the sensor 50. The sensor 50 may operate on electric power supplied from the two-wire transmitter 100. The sensor 50 may operate on electric power supplied from a power source other than the two-wire transmitter 100.

The measured data processing circuit 102 includes a signal processing circuit 104, a switch circuit 103, and a first signal generation circuit 105.

The signal processing circuit 104 may be configured as a general purpose integrated circuit such as a CPU (Central Processing Unit). The signal processing circuit 104 may realize various functions by executing a predetermined program. The signal processing circuit 104 may include a memory. The two-wire transmitter 100 may include a memory independent of the signal processing circuit 104. The memory may store various information used for the operation of the signal processing circuit 104, a program for realizing the function of the signal processing circuit 104, or the like. The memory may function as a working memory of the signal processing circuit 104. The memory may be configured as, for example, a semiconductor memory.

The signal processing circuit 104 acquires the measurement signal S1 from the sensor 50. The signal processing circuit 104 may communicate with the sensor 50 based on a standard such as RS485.

The signal processing circuit 104 converts the measurement signal S1 into a PWM signal and outputs the PWM signal to the switch circuit 103. The PWM signal output to the switch circuit 103 is referred to as a current signal PWM signal. The signal processing circuit 104 may perform predetermined processing such as linearity correction or the like on the measurement signal S1 before converting the measurement signal S1 into the PWM signal. The predetermined processing may include processing such as, for example, linearity correction. The signal processing circuit 104 is not limited to the pulse width modulation method and may modulate the measurement signal S1 using various modulation methods such as, for example, a pulse density modulation method or a pulse amplitude modulation method.

The switch circuit 103 includes a switch SW1, a first reference voltage source PR1, and a second reference voltage source PR2. The first reference voltage source PR1 outputs a voltage represented by VR1, and the second reference voltage source PR2 outputs a voltage represented by VR2. The switch SW1 includes two fixed contacts and one movable contact. Each of the fixed contacts is connected to the first reference voltage source PR1 and the second reference voltage source PR2. The movable contact is connected to a signal line L3 that outputs a signal to the first signal generation circuit 105.

The movable contact of the switch SW1 is in contact with any one of the fixed contacts based on the voltage level of the PWM signal input from the signal processing circuit 104, and thus outputs one of the voltages VR1 and VR2 to the signal line L3. The PWM signal includes two voltage level signals, which are referred to as High and Low, respectively. The voltage level called High is also referred to as an H level. The voltage level referred to as Low is also referred to as an L level. The PWM signal represents a value of 0 to 100% by the duty ratio representing a time ratio of each voltage level within a predetermined period. For example, a PWM signal in which the H level continues for half of the predetermined period and the L level continues for the other half represents 50%. A PWM signal in which the L level continues for the predetermined period represents 0%. A PWM signal in which the H level continues for the predetermined period represents 100%. In the present embodiment, the L level is a ground voltage. The L level voltage is also referred to as an L voltage. The H level is a predetermined voltage. The predetermined voltage may be appropriately set. The H level voltage is also referred to as an H voltage. For example, when the voltage level of the PWM signal corresponds to the L level, the movable contact of the switch SW1 may contact the fixed contact connected to the first reference voltage source PR1 and output the voltage represented by VR1 to the signal line L3. For example, when the voltage level of the PWM signal corresponds to the H level, the movable contact of the switch SW1 may contact the fixed contact connected to the second reference voltage source PR2 and output the voltage represented by VR2 to the signal line L3. When the switch circuit 103 controls the contact destination of the movable contact, the signal S2 including the voltage level of either VR1 or VR2 is output to the signal line L3. The signal S2 will also be referred to as a control signal.

The first signal generation circuit 105 includes a LPF 1 that includes a resistor R2 and a capacitor C1. The first signal generation circuit 105 may further include a buffer amplifier Q1. The buffer amplifier Q1 may be configured as an operational amplifier. The first signal generation circuit 105 performs denoising on the signal S2 using the LPF 1 and converts the signal S2 into a DC signal. The first signal generation circuit 105 buffers the DC signal converted by the LPF 1 using the buffer amplifier Q1 and outputs the buffered DC signal as the first signal Va. The first signal generation circuit 105 outputs the first signal Va to the current output circuit 106 via the signal line L4. The first signal generation circuit 105 outputs the first signal Va to the shunt regulator circuit 108 via a signal line L5. The first signal generation circuit 105 is not limited to the configuration to be separated into the LPF 1 and the buffer amplifier Q1 and may be configured as an active filter in which the LPF 1 and the buffer amplifier Q1 are integrated. In the first signal generation circuit 105, the LPF 1 may be replaced with an active filter.

The operation of the current output circuit 106 will be described with reference to FIG. 4.

Figure 4:
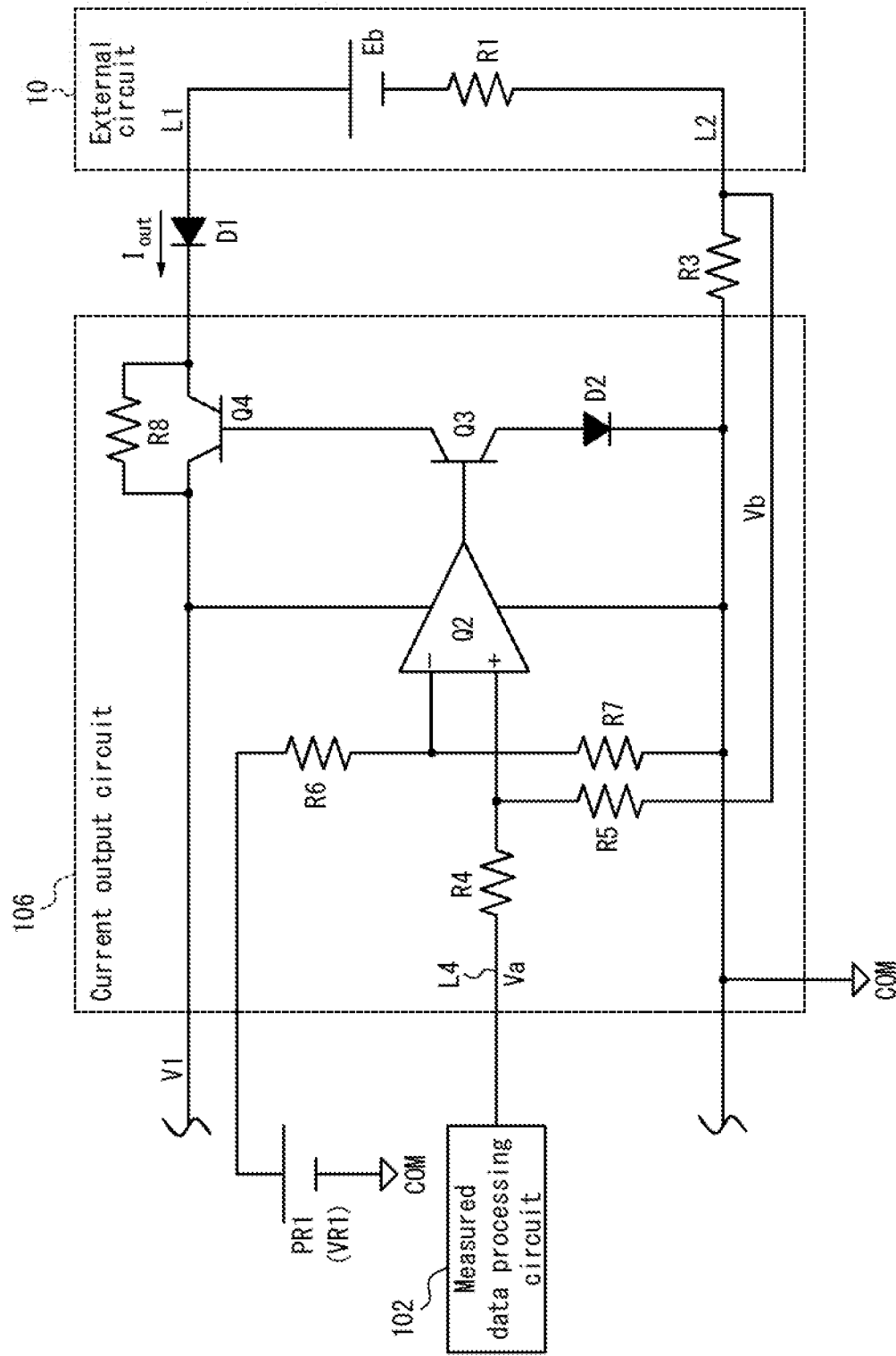
FIG. 4 is a circuit diagram illustrating an example configuration of a current output circuit.

The current output circuit 106 is connected to the external circuit 10 via transmission lines L1 and L2, as illustrated in FIG. 4. That is, the two-wire transmitter 100 according to the present embodiment can be connected to the external circuit 10. The external circuit 10 includes a voltage source Eb and a resistor R1. The voltage source Eb and the resistor R1 are connected in series with the transmission lines L1 and L2. The current output circuit 106 draws a current represented by Iout from the transmission line L1 via a diode D1 and flows a current represented by Iout to the transmission line L2 via the resistor R3. Thus, current output circuit 106 outputs the current signal to the external circuit 10. The current output circuit 106 acquires the first signal Va from the measured data processing circuit 102. The current output circuit 106 outputs a current signal Iout to the external circuit 10 based on the first signal Va. That is, the two-wire transmitter 100 determines the current signal Iout to be output to the external circuit 10 based on the first signal Va. The external circuit 10 can acquire information based on the measured data of the sensor 50 from the two-wire transmitter 100 based on the current signal Iout.

The current output circuit 106 includes an error amplifier Q2. The error amplifier Q2 may be configured as an operational amplifier. A non-inverting terminal of the error amplifier Q2 is connected to a signal line L4 that inputs the first signal Va from the measured data processing circuit 102 via a resistor R4. The signal line L4 is connected to the ground line via resistors R4, R5, and R3. The voltage of the transmission line L2 is represented by Vb. A voltage obtained by separating the potential difference between the first signal Va and the voltage Vb using the resistor R4 and the resistor R5 is input to a non-inverting terminal of the error amplifier Q2. The voltage Vb corresponds to a voltage drop that occurs across the resistor R3 due to the current flowing through the resistor R3. The current flowing through the resistor R3 corresponds to the current signal Iout. A voltage obtained by separating a potential difference between the first signal Va and the voltage Vb using the resistor R4 and the resistor R5 is input to the non-inverting terminal of the error amplifier Q2, and thus a signal associated with the current signal Iout is supplied as feedback to the non-inverting terminal of the error amplifier Q2. The inverting terminal of the error amplifier Q2 is connected to the first reference voltage source PR1 via the resistor R6 and also to the ground line via the resistor R7. A voltage obtained by separating a voltage VR1 output from the first reference voltage source PR1 using the resistors R6 and R7 is input to the inverting terminal of the error amplifier Q2.

The current output circuit 106 includes a transistor Q3 and a transistor Q4. The transistor Q3 may be configured as an npn transistor. The transistor Q4 may be configured as a pnp transistor. The transistor Q4 is connected to the transmission line L1 that connects between the external circuit 10 and the two-wire transmitter 100 via the diode D1 on an emitter side, and is connected to the power supply line on a collector side. A resistor R8 is connected in parallel to an emitter and a collector of the transistor Q4. The two-wire transmitter 100 can be activated by electric power supplied from the external circuit 10 via the resistor R8. A base of the transistor Q4 is connected to the collector of the transistor Q3. The emitter of the transistor Q3 is connected to the ground line via the diode D2. The emitter of the transistor Q3 may be connected to the ground line without using the diode, or may be connected to the ground line via a resistor or other element. The output of the error amplifier Q2 is connected to a base of the transistor Q3. That is, the output of the error amplifier Q2 is input to the base of the transistor Q3.

The error amplifier Q2 detects the difference between the voltage input to the non-inverting terminal and the voltage input to the inverting terminal, amplifies the difference, and then outputs the amplified difference. The error amplifier Q2 controls the current flowing through the transistors Q3 and Q4 to match the voltage input to the non-inverting terminal and the voltage input to the inverting terminal. In particular, a base current of the transistor Q3 and a collector current of the transistor Q3 are determined based on the output of the error amplifier Q2. In the transistor Q4, an emitter current is determined by the base current. The base current of the transistor Q4 matches the collector current of the transistor Q3 determined based on the output of the error amplifier Q2. Thus, the emitter current of the transistor Q4 is determined based on the output of the error amplifier Q2. The emitter current of the transistor Q4 corresponds to the current signal represented by Iout drawn from the external circuit 10. The non-inverting terminal of the error amplifier Q2 is connected to the ground line via the resistor R3. That is, the output of the error amplifier Q2 is supplied as feedback to the non-inverting terminal of the error amplifier Q2 via the resistor R3.

The parameters of each circuit element of the current output circuit 106 can be appropriately set so that the measurement range of the measured data of the sensor 50 corresponds to the range of the magnitude of the current signal. When the current signal is an instrumentation standard signal, the parameter may be set so that the range of the magnitude of the current signal corresponding to the measurement range of the measured data is between 4 mA and 20 mA. The measurement signal of the sensor 50 may represent a value of 0% as a signal corresponding to the lower limit of the measurement range of the sensor 50, or a value of 100% as a signal corresponding to the upper limit of the measurement range. That is, the measurement signal may represent the measured data of the sensor 50 as a value from 0% to 100%. The magnitude of the current signal may be the lower limit of 4 mA when the measurement signal represents a value of 0%, and may be the upper limit of 20 mA when the measurement signal represents a value of 100%.

For example, the magnitude of the current signal may be set on the premise of the following conditions represented by items (a) to (f).
(a) R6>>R7
(b) R4=R5
(c) R5>>R3
(d) VR1=0.4 V
(e) VR2=2.0 V
(f) The switch SW1 outputs VR1 to the signal line L3 when the voltage level of the input PWM signal is at the L level, and outputs VR2 to the signal line L3 when the voltage level is at the H level.

Under the conditions of the items (a) to (f), the current output circuit 106 operates as follows. Based on the item (a), the voltage at the inverting terminal of the error amplifier Q2 becomes the COM voltage. The error amplifier Q2 controls the currents of the transistors Q3 and Q4 so that the voltage at the non-inverting terminal becomes the COM voltage. At this time, Vb=−Va is satisfied based on the item (b), and Iout=Va/R3 is satisfied based on the item (c). Here, the resistance value of the resistor R3 is assumed to be 100Ω. Based on the items (d) to (f), the first signal Va output from the first signal generation circuit 105 is 0.4 V when the voltage level of the PWM signal is constant at the L level. In this case, the current signal Iout has the lower limit value of 4 mA. The first signal Va becomes 2.0 V when the voltage level of the PWM signal is constant at the H level. In this case, the current signal Iout has the upper limit value of 20 mA. In this way, the lower limit value and the upper limit value of the current signal may be set.

The operation of the shunt regulator circuit 108 will be described with reference to FIG. 5.

The shunt regulator circuit 108 acquires the first signal Va from the measured data processing circuit 102. The shunt regulator circuit 108 controls the circuit voltage V1 to be applied to the two-wire transmitter 100 based on the first signal Va. The circuit voltage V1 corresponds to a voltage applied between the ground line and the power supply line. In FIG. 5, the ground line is a wiring connected to a ground point represented by a COM. The voltage of the ground line is also referred to as a ground voltage or a COM voltage. The power supply line is a wiring represented by V1.

Figure 5:
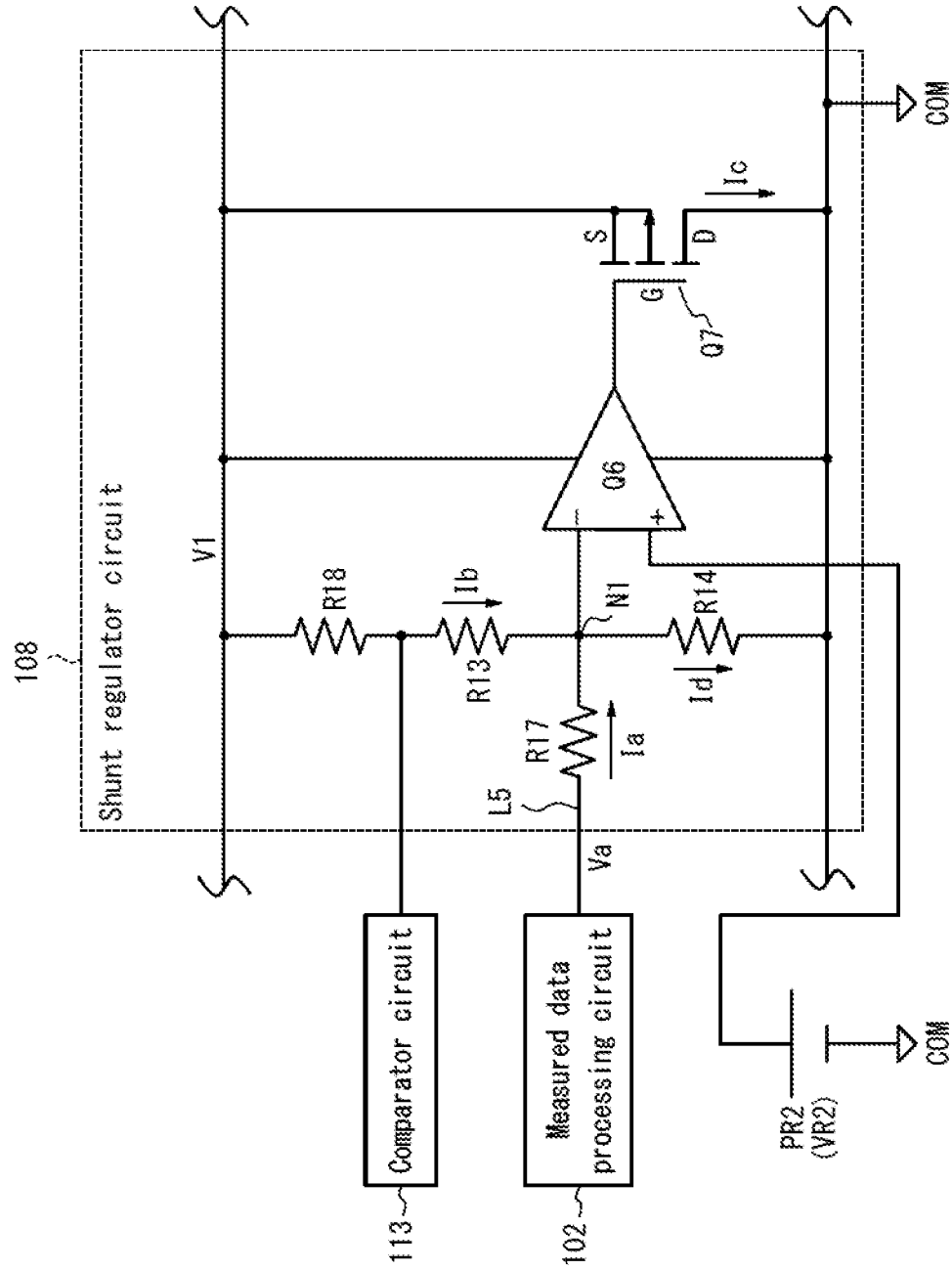
FIG. 5 is a circuit diagram illustrating an example configuration of a shunt regulator circuit.

The shunt regulator circuit 108 includes the error amplifier Q6, as illustrated in FIG. 5. The error amplifier Q6 is assumed to be an operational amplifier. An inverting terminal of the error amplifier Q6 is connected to the signal line L5 to which the first signal Va is input from the measured data processing circuit 102 via a resistor R17. A node N1 located between the resistor R17 and the non-inverting terminal of the error amplifier Q6 is connected to the ground line via the resistor R14. The node N1 is connected to the power supply line via resistors R13 and R18. The voltage at the node N1 is a voltage obtained by separating the first signal Va using the resistor R17 and the resistor R14. That is, a voltage obtained by separating the first signal Va using the resistors R17 and R14 is input to the inverting terminal of the error amplifier Q6. The non-inverting terminal of the error amplifier Q6 is connected to the second reference voltage source PR2. A voltage VR2 output from the second reference voltage source PR2 is input to the non-inverting terminal of the error amplifier Q6.

The shunt regulator circuit 108 includes a transistor Q7. The transistor Q7 is assumed to be a p-channel MOSFET (Metal Oxide Semiconductor Field Effect Transistor). The transistor Q7 is not limited to a p-channel MOSFET and may be configured as a pnp transistor. When the input to the inverting input terminal of the error amplifier Q6 and the input to the non-inverting input terminal are interchanged, the transistor Q7 may be replaced with an n-channel MOSFET or an npn transistor. The transistor Q7 includes a source connected to the power supply line and a drain connected to the ground line. The output of the error amplifier Q6 is connected to the gate of the transistor Q7. That is, the output of the error amplifier Q6 is input to the gate of the transistor Q7.

The error amplifier Q6 detects the difference between the voltage input to the non-inverting terminal and the voltage input to the inverting terminal, amplifies the difference, and outputs the amplified difference. The error amplifier Q6 controls a current Ic flowing through the transistor Q7 to match the voltage input to the non-inverting terminal and the voltage input to the inverting terminal. In particular, the shunt regulator circuit 108 controls the circuit voltage V1 so that the voltage at the inverting terminal of the error amplifier Q6 becomes VR2. That is, the voltage at the node N1 is controlled to be VR2. When the voltage at the node N1 is VR2, a current Id flowing through the resistor R14 is calculated by Id=VR2/R14 and becomes a constant value.

A current Ia that flows through the resistor R17 based on the difference between the first signal Va and the voltage at the node N1 is calculated from Ia=(Va−VR2)/R17.

A current Ib that flows through the resistors R18 and R13 based on the difference between the circuit voltage V1 and the voltage at the node N1 is calculated from Ib=(V1−VR2)/(R13+R18).

The current Id corresponds to a sum of current Ia and current Ib. Based on the fact that the current Id is a constant value, Ib decreases as the current Ia increases. Based on the equations for calculating the current Ia and the current Ib, the circuit voltage V1 decreases as the first signal Va increases.

Because Id=Ia+Ib is satisfied, the circuit voltage V1 is calculated from the following equation (1):

$$V1 = [1+(R13+R18)/R17+(R13+R18)/R14] \times VR2 - (R13+R18)/R17 \times Va \qquad (1).$$

In a case in which specific numerical values as indicated as items (g) to (i) below are applied as resistance values, the circuit voltage V1 becomes 12 V when the current signal Iout is 4 mA, and the current signal Iout becomes 6 V when the current is 20 mA.

(g) R14=150 kΩ

(h) R17=80 kΩ

(i) R18+R13=300 kΩ

The first term on the right side of the equation (1) indicates that the circuit voltage V1 is determined based on VR2. The second term on the right side of the equation (1) indicates that the circuit voltage V1 is determined based on Va. When the two-wire transmitter 100 is activated, the output of the buffer amplifier Q1 of the first signal generation circuit 105 may have a high electrical impedance. When the output of the buffer amplifier Q1 has a high electrical impedance, the first signal Va output from the buffer amplifier Q1 can be indefinite. However, even when Va is indefinite, the circuit voltage V1 can be determined based on the first term on the right side of the equation (1) set forth above. As a result, a state in which the circuit voltage V1 becomes indefinite at the time of activation can be avoided.

By determining the circuit voltage V1, a situation in which the output of the error amplifier Q6 of the shunt regulator circuit 108 is fixed to the COM voltage can be avoided. If the output of the error amplifier Q6 is fixed to the COM voltage, the transistor Q7 is turned on. When the transistor Q7 is turned on, all or most of the current supplied to the two-wire transmitter 100 may flow to the transistor Q7. If this happens, a current supplied to other circuits of the two-wire transmitter 100 falls insufficient, possibly hindering the activation of the two-wire transmitter 100. By preventing the output of the error amplifier Q6 from becoming fixed to the COM voltage, a situation in which an excessive current flows through the transistor Q7 at the time of activation can be avoided. As a result, inhabitation of activation of other circuits of the two-wire transmitter 100 can be avoided.

As described above, in the two-wire transmitter 100 according to the present embodiment, both the current output circuit 106 and the shunt regulator circuit 108 operate based on the first signal Va generated by the first signal generation circuit 105. In the two-wire transmitter 100 according to the present embodiment, the current output circuit 106 and the shunt regulator circuit 108 operate based on the common first signal Va. Thus, the above-mentioned problem resulting from the difference in transient response between LPF3 and LPF4 can be avoided. As a result, operational stability is improved.

According to the two-wire transmitter 100 of the present embodiment, further, the circuit voltage V1 is determined by the voltage VR2 output from the second reference voltage source PR2 when the two-wire transmitter 100 is activated. Thus, a situation in which the circuit voltage V1 becomes indefinite at the time of startup can be avoided. As a result, the circuit of the two-wire transmitter 100 is activated more reliably.

The two-wire transmitter 100 may further include a reference voltage output unit 110, an LPF2 that includes a resistor R9 and a capacitor C2, and a comparator circuit 113, as illustrated in FIG. 3. The comparator circuit 113 includes a comparator Q8. A non-inverting input terminal of the comparator Q8 is connected to the shunt regulator circuit 108. An inverting input terminal of the comparator Q8 is connected to the LPF2 that includes the resistor R9 and the capacitor C2.

The reference voltage output unit 110 outputs a PWM signal based on the measurement signal S1 from the sensor 50. The reference voltage output unit 110 controls the duty ratio of the PWM signal based on the measurement signal S1. The smaller the measurement signal S1, the more the duty ratio of the PWM signal may be set to increase. The LPF2 that includes the resistor R9 and the capacitor C2 outputs a DC signal obtained by smoothing the PWM signal output from the reference voltage output unit 110 to the inverting input terminal of comparator Q8. That is, the DC signal based on the measurement signal S1 is input to the inverting input terminal of the comparator Q8.

The comparator circuit 113 acquires a signal associated with the circuit voltage V1 from the shunt regulator circuit 108. The signal associated with the circuit voltage V1 is input to the non-inverting input terminal of the comparator Q8. The signal associated with the circuit voltage V1 corresponds to a voltage obtained by separating the circuit voltage V1 using the resistance value of the resistor R18 and the sum of the resistance values of the resistors R13 and R14 (see FIG. 5).

The comparator Q8 compares the signal associated with the circuit voltage V1 with the DC signal based on the measurement signal S1, and determines whether the circuit voltage V1 is equal to or higher than a predetermined value or lower than the predetermined value. The comparator Q8 outputs a signal associated with the determination result to the signal processing circuit 104. The comparator Q8 may output a signal whose voltage level is at the H level when the circuit voltage V1 is equal to or higher than the predetermined value, or a signal whose voltage level is at the L level when the circuit voltage V1 is smaller than the predetermined value. The signal processing circuit 104 can confirm whether the circuit voltage V1 is equal to or higher than the predetermined value, based on the voltage level of the signal output from the comparator Q8. When the circuit voltage V1 is smaller than the predetermined value, the signal processing circuit 104 may determine that the two-wire transmitter 100 is in an abnormal state. In a case in which the signal processing circuit 104 determines that the two-wire transmitter 100 is in an abnormal state, the signal processing circuit 104 may execute processing corresponding to the abnormal state. The process corresponding to the abnormal state may include, for example, a process of saving the value of the measurement signal S1 from the sensor 50.

Figure 6:
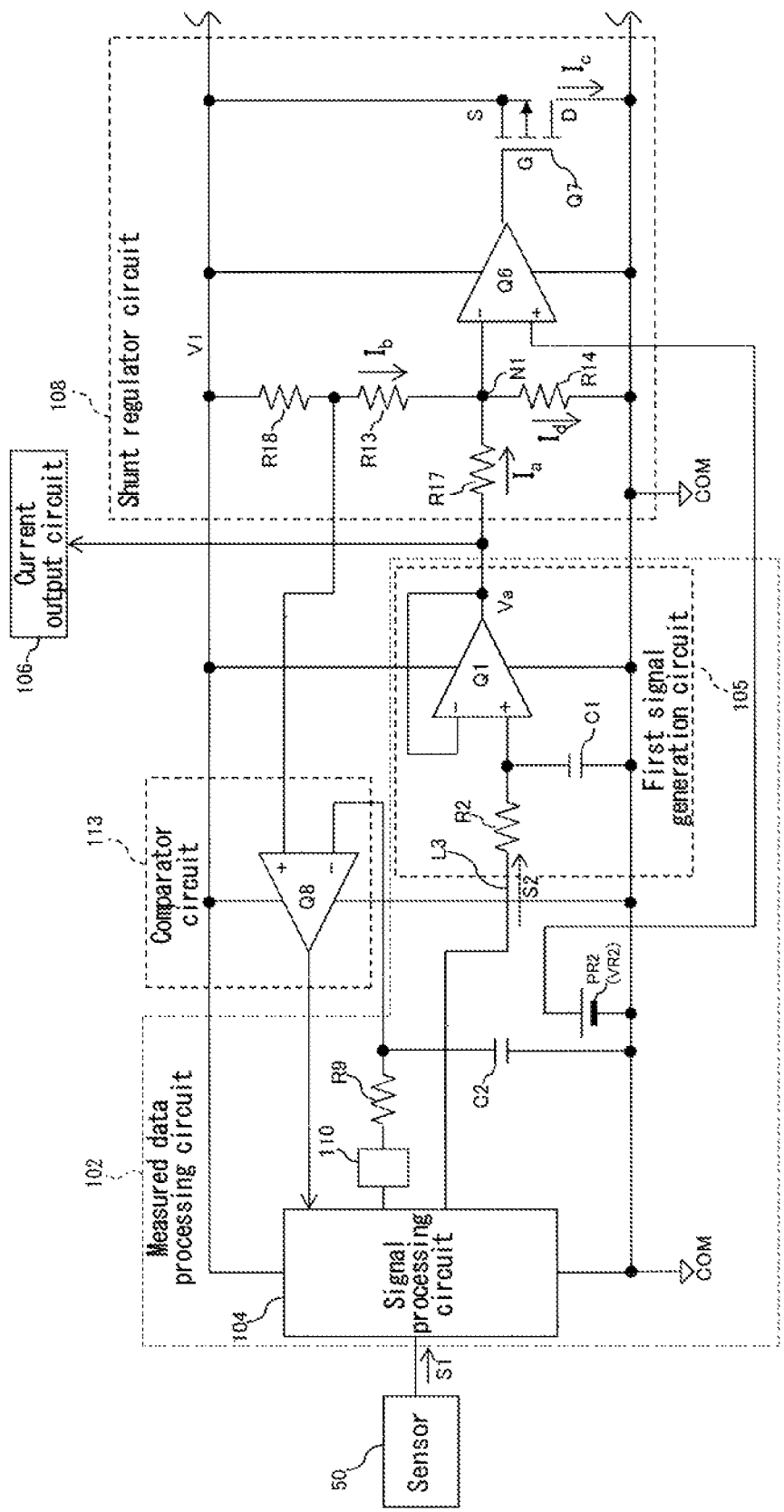
FIG. 6 is a circuit diagram illustrating an example configuration of a two-wire transmitter according to another embodiment.

In the two-wire transmitter 100 according to another embodiment, some circuit elements may be omitted as illustrated in FIG. 6. The measured data processing circuit 102 includes the first reference voltage source PR1 and the switch SW1 in FIG. 3, while the measured data processing circuit 102 does not include them in FIG. 6. The example configuration of FIG. 6 does not include a configuration corresponding to the switch circuit 103 illustrated in FIG. 3. In FIG. 6, the signal processing circuit 104 outputs the PWM signal as the signal S2 directly to the signal line L3 without using the configuration corresponding to the switch circuit 103. The H voltage of the signal S2 as the PWM signal may be appropriately set. The H voltage of the signal S2 may be set based on the voltage VR2 output from the second reference voltage source PR2. The H voltage of the signal S2 may be set to a value greater than the voltage VR2, a value equal to the voltage VR2, or a value smaller than the voltage VR2.

The signal S2 input to the signal line L3 is smoothed by the LPF1 that includes the resistor R2 and the capacitor C1, buffered by the buffer amplifier Q1, and then converted into the first signal Va. The voltage of the first signal Va is determined based on the H voltage and the duty ratio of the signal S2. For example, when the duty ratio of the signal S2 is 50%, the voltage of the first signal Va is set to a value half the H voltage of the signal S2. In a case in which the H voltage of the signal S2 is assumed to be 2.0 V, when the first signal Va is controlled between, for example, 0.4 V and 2.0 V, the duty ratio of the signal S2 is controlled between 20% and 100%.

The voltage of the first signal Va corresponding to the case in which the measurement signal of the sensor 50 has a value of 100% is the same as the voltage VR2, in the embodiment illustrated in FIG. 3. As the value of the measurement signal decreases, the first signal Va decreases. That is, the first signal Va becomes the voltage VR2 or less, regardless of the value of the measurement signal between 0% and 100%.

On the other hand, the H voltage of the signal S2 can be set to a voltage different from VR2 in another embodiment illustrated in FIG. 6. When the H voltage of the signal S2 is set to a voltage different from VR2, the voltage of the first signal Va corresponding to a case in which the measurement signal of the sensor 50 has a value of 100% may be different from VR2.

In the shunt regulator circuit 108, a current based on the potential difference between VR2 and Va flows through the resistor R17. When Va is lower than VR2, the current of the resistor R17 flows in the direction from the error amplifier Q6 side toward the buffer amplifier Q1 side. The direction directed from the error amplifier Q6 side to the buffer amplifier Q1 side will also be referred to as a first direction. When Va is higher than VR2, the current of the resistor R17 flows in the direction from the buffer amplifier Q1 side to the error amplifier Q6 side. The direction directed from the buffer amplifier Q1 side to the error amplifier Q6 side will also be referred to as a second direction. That is, the flowing direction of the current of the resistor R17 changes depending on whether Va is lower or higher than VR2.

When Va and VR2 corresponding to a measurement signal having a predetermined value of 0% or more and 100% or less are set to the same value, the magnitude relationship between Va and VR2 changes depending on the value of the measurement signal. When the measurement signal is at a predetermined value, Va and VR2 are the same value. In this case, a current does not flow through the resistor R17. When the measurement signal is smaller than the predetermined value, Va is lower than VR2. In this case, the current of the resistor R17 flows in the first direction. When the measurement signal is larger than the predetermined value, Va is higher than VR2. In this case, the current of the resistor R17 flows in the second direction.

When Va and VR2 corresponding to the measurement signal having a value of 100% are set to the same value, the current flows through the resistor R17 only in the first direction. In this case, it can be said that the predetermined value is set to 100%.

The larger a difference between the measurement signal and the predetermined value, the larger the current flowing through the resistor R17, and also the larger the power consumption of the resistor R17. Here, it is assumed that a probability distribution of the value of the measurement signal is uniform between 0% and 100%. Under this assumption, when the predetermined value is set to 50%, the power consumption within the resistor R17 can be minimized. On the other hand, when the predetermined value is set to 100%, the power consumption within the resistor R17 can be maximized. That is, by setting the predetermined value to be greater than 0% and less than 100%, the power consumption in the resistor R17 can be reduced, as compared with the case in which the predetermined value is set to 100%.

The inverting input terminal of the error amplifier Q2 in the current output circuit 106 is connected to the first reference voltage source PR1 via the resistors R6 and R7 in FIG. 3, while the inverting input terminal is connected to the ground line in FIG. 6. Further, the current output circuit 106 does not include the resistors R6 and R7 in FIG. 6.

The configuration illustrated in FIG. 6 in which the inverting input terminal of the error amplifier Q2 in the current output circuit 106 is connected to the ground line corresponds to the case in which the voltage VR1 output from the first reference voltage source PR1 in FIG. 3 is set to 0V. That is, the current output circuit 106 of FIG. 6 can determine the current signal based on the first signal Va, in a manner similar to the operation described with reference to FIG. 4.

The two-wire transmitter 100 illustrated in FIG. 6 by way of example may be configured using fewer constituent elements than the two-wire transmitter 100 illustrated in FIG. 1. As a result, a reduction in the constituent element mounting area or cost reduction can be realized.

Figure 7:
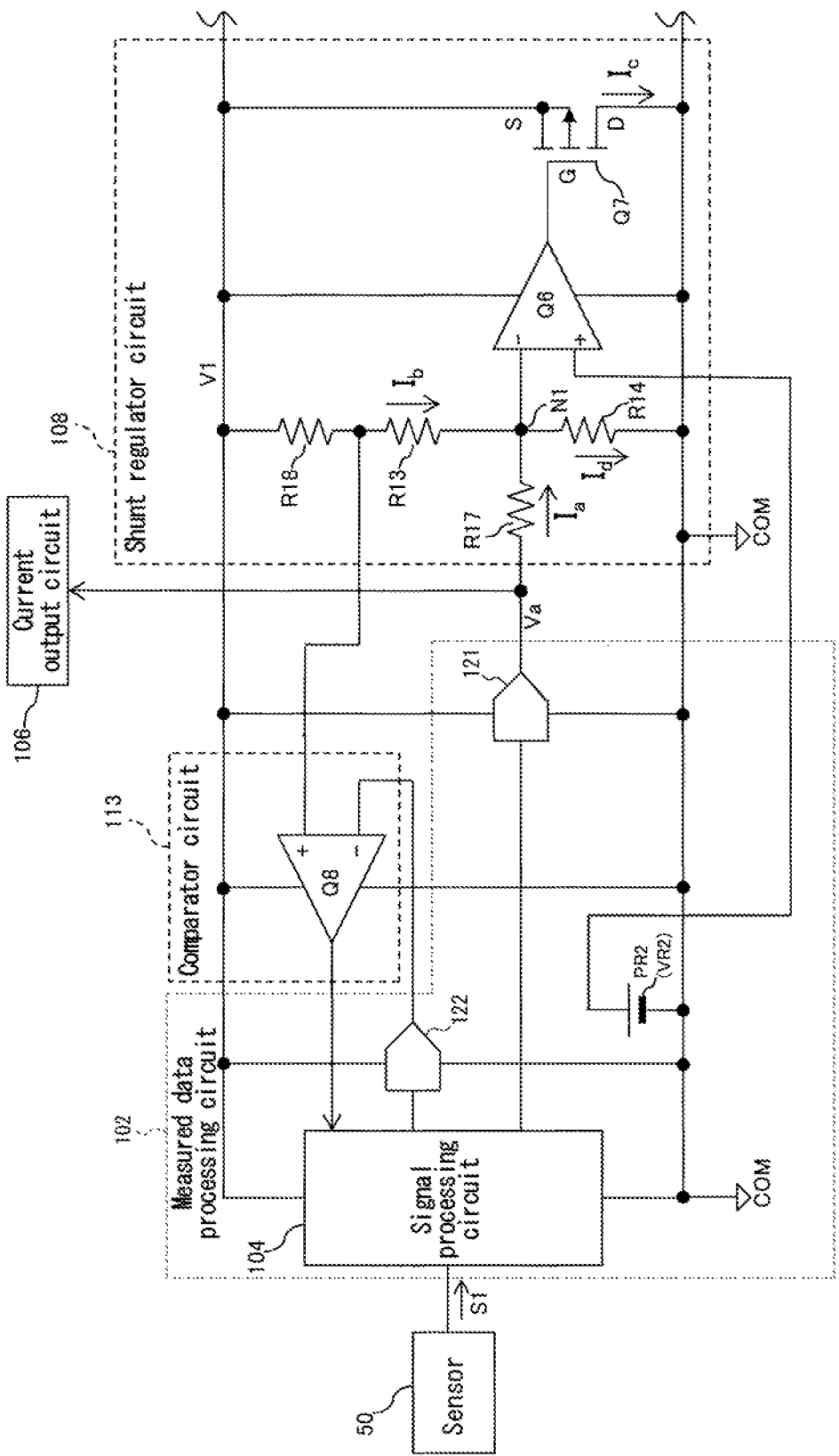
FIG. 7 is a circuit diagram illustrating an example configuration of a two-wire transmitter that includes a DA converter.

The two-wire transmitter 100 according to an embodiment may include a DA converter 121, as illustrated in FIG. 7. The switch circuit 103 and the first signal generation circuit 105 included in the two-wire transmitter 100 illustrated in FIG. 3 are replaced with the DA converter 121 in FIG. 7. The DA converter 121 substitutes the functions of the switch circuit 103 and the first signal generation circuit 105 by converting a signal based on the measurement signal output from the signal processing circuit 104 into the first signal Va. In this case, the signal processing circuit 104 outputs a control signal as the signal based on the measurement signal. The control signal includes a digital signal indicating a value of the measurement signal between 0% and 100%. The DA converter 121 converts a digital signal into an analog signal and outputs the analog signal as the first signal Va.

The two-wire transmitter 100 may include a DA converter 122. The reference voltage output unit 110 and the LPF 2 that includes the resistor R9 and the capacitor C2 included in the two-wire transmitter 100 illustrated in FIG. 3 are replaced with the DA converter 122 in FIG. 7. The DA converter 122 substitutes the functions of the reference voltage output unit 110 and the LPF 2 by converting the reference voltage signal output from the signal processing circuit 104 into a DC signal.

The DA converter 121 or the DA converter 122 may be arranged in a manner independent of the signal processing circuit 104 or may be included in the signal processing circuit 104. By replacing some of the circuit elements of the two-wire transmitter 100 with the DA converter 121 or the DA converter 122, the number of constituent elements can be reduced. As a result, a reduction in the constituent element mounting area or cost reduction can be realized, and operation stability is improved.

In a case in which the signal processing circuit 104 enters an abnormal state due to runaway or the like, the first signal Va may become indefinite. In this case, burnout of the current signal output from the current output circuit 106 needs to be performed. Burnout refers to an operation to flow a current of, for example, 3.6 mA or less or 21.6 mA or more as a current signal.

Figure 8:
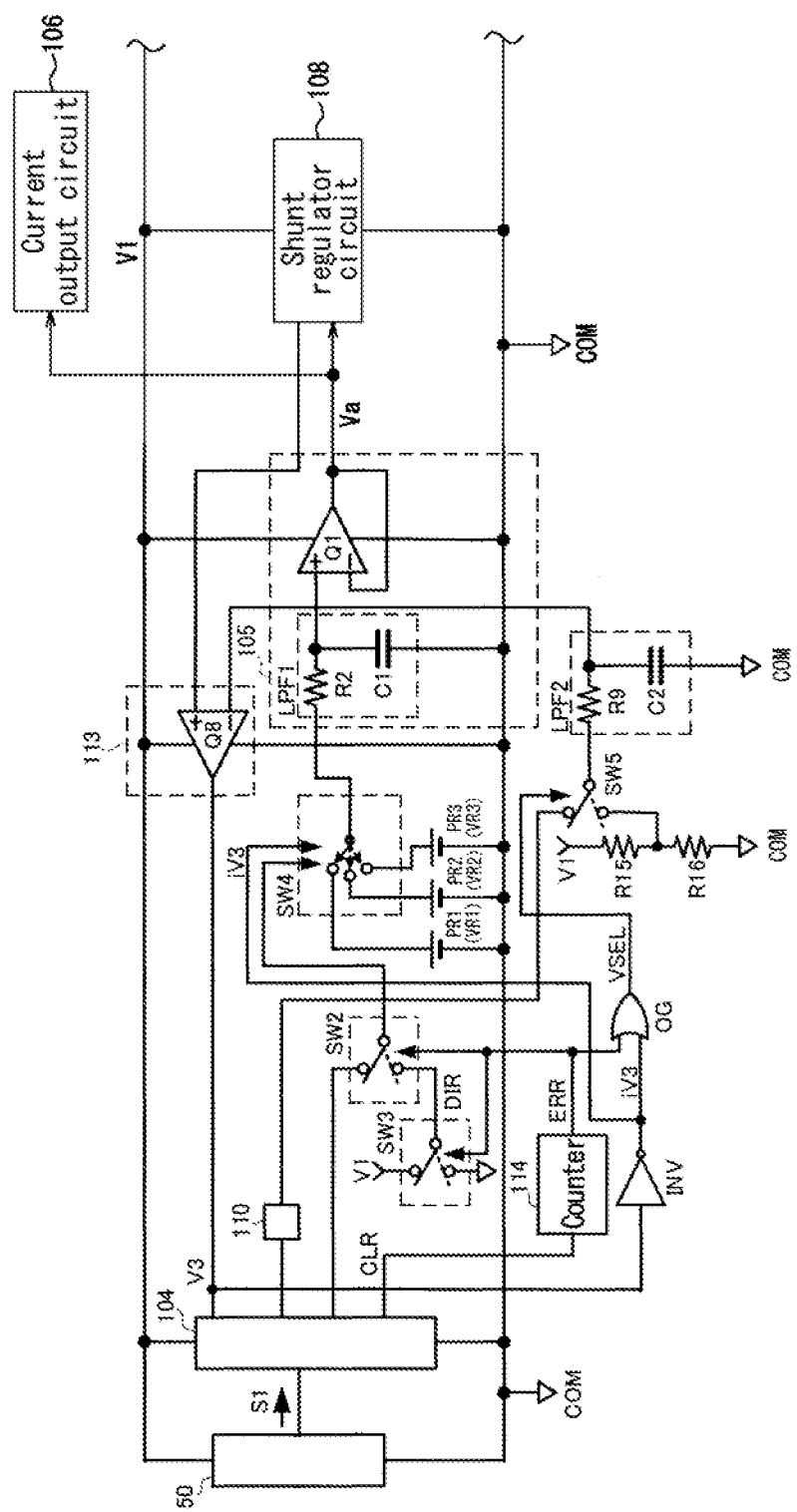
FIG. 8 is a circuit diagram illustrating an example configuration of a two-wire transmitter that includes an abnormal state detection circuit.

For example, burnout can be realized by the two-wire transmitter 100 according to an embodiment illustrated in FIG. 8. In FIG. 8, details of the configurations of the current output circuit 106 and the shunt regulator circuit 108 will be omitted.

The two-wire transmitter 100 illustrated in FIG. 8 includes switches SW2, SW3, SW4, and SW5, a counter 114, an OR gate OG, and an inverter INV. The configuration constituted by them will also be referred to as an abnormal state detection circuit. The abnormal state detection circuit is not limited to the configuration illustrated in FIG. 8 and may be realized in other various forms.

The switch SW4 includes three fixed contacts. A first fixed contact of the switch SW4 is connected to the positive electrode of the first reference voltage source PR1 that outputs the voltage VR1. A second fixed contact of the switch SW4 is connected to the positive electrode of the second reference voltage source PR2 that outputs the voltage VR2. A third fixed contact of the switch SW4 is connected to the positive electrode of the third reference voltage source PR3 that outputs a voltage VR3. A movable contact of the switch SW4 is connected to the signal line L3. This configuration enables the switch SW4 to selectively output any one of the voltages VR1, VR2, and VR3 to the current output circuit 106 based on the operation state of the signal processing circuit 104.

The counter 114 is configured as a free-running counter that detects abnormality in the signal processing circuit 104. The counter 114 outputs an error signal ERR at a predetermined level corresponding to the state of the signal processing circuit 104. The counter 114 is cleared at the edge of the clear signal CLR input from the signal processing circuit 104. The error signal ERR is cleared and becomes the L level when the signal processing circuit 104 is operating normally. When the signal processing circuit 104 is in an abnormal state due to runaway or the like of the CPU arranged therein, the error signal ERR is not cleared and overflows, and then becomes the H level.

The error signal ERR is input to the switches SW2 and SW3 as a switching signal, and is also input to one of the input terminals of the OR gate OG. The output signal V3 of the comparator Q8 is input to the other one of the input terminals of the OR gate OG via the inverter INV. An output signal iV3 of the inverter INV is also input to the switch SW4 as a switching signal. The "i" in the iV3 representing the output signal is a symbol representing an inverted signal. The output signal of the OR gate OG is input to the switch SW5 as a voltage switching signal VSEL.

The switch SW2 includes two fixed contacts and selectively outputs a signal indicating whether the signal processing circuit 104 is in a normal state or an abnormal state. The current signal PWM signal is input to one of the fixed contacts of the switch SW2 from the signal processing circuit 104. The output signal of the switch SW3 is input to the other one of the fixed contacts of the switch SW2. An output signal output from the movable contact of the switch SW2 is input to the switch SW4 as a switching signal.

The movable contact of the switch SW2 operates based on whether the signal processing circuit 104 is in a normal state or an abnormal state. When the error signal ERR indicates a normal state at the L level, the movable contact of the switch SW2 selects the fixed contact to which the current signal PWM signal is input. When the error signal ERR indicates an abnormal state at the H level, the movable contact of the switch SW2 selects the fixed contact to which an abnormal direction instruction signal DIR of the switch SW3 is input.

The switch SW3 includes two fixed contacts and selectively outputs a current indicating whether the abnormal state of the signal processing circuit 104 exceeds the upper limit or falls below the lower limit. The circuit voltage V1 is input to one of the fixed contacts of the switch SW3. The other one of the fixed contacts of the switch SW3 is connected to the ground point. The output signal output from the movable contact of the switch SW3 is input to the other one of the fixed contacts of the switch SW2 as the abnormal direction instruction signal DIR.

When the signal processing circuit 104 is in an abnormal state, the movable contact of the switch SW3 selects one of the fixed contacts, such that the signal indicating whether the abnormal state of the signal processing circuit 104 exceeds the upper limit or falls below the lower limit is output to the current output circuit 106 as the first signal Va. For example, the movable contact of the switch SW3 may select the fixed contact to which the circuit voltage V1 is input, such that the current output from the current output circuit 106 when the current signal Iout exceeds the upper limit becomes equal to or more than 21.6 mA, and output the circuit voltage V1 as the abnormal direction instruction signal DIR. For example, the movable contact of the switch SW3 may select the fixed contact to which the ground voltage is input, such that the current output from the current output circuit 106 when the current signal Iout falls below the lower limit becomes equal to or less than 3.6 mA, and output the ground contact voltage as the abnormal direction instruction signal DIR. Although the error signal ERR is input as the switching signal of the switch SW3 in FIG. 8, other signals may be input.

The switch SW5 includes two fixed contacts and selects a voltage to be input to the comparator circuit 113. The reference voltage PWM signal is input to one of the fixed contacts of the switch SW5. A connection point between resistors R15 and R16 connected in series is connected to the other one of the fixed contacts of the switch SW5. An output signal output from the movable contact of the switch SW5 is input to one end of a resistor R9 that constitutes the LPF2. The circuit voltage V1 is input to one end of the resistor R15 connected in series, and the other end of the resistor R16 is connected to a common potential point.

The movable contact of the switch SW5 selects a fixed contact to connect based on the voltage switching signal VSEL output from the OR gate OG. The voltage switching signal VSEL becomes the H level when the output signal V3 of the comparator Q8 is at the L level or when the signal processing circuit 104 is in an abnormal state. When the voltage switching signal VSEL is at the H level, the movable contact of the switch SW5 selects a fixed contact to which the voltage obtained by separating the circuit voltage V1 by the series circuit of the resistors R15 and R16 is input. The voltage switching signal VSEL becomes the L level when the output signal V3 of the comparator Q8 is at the H level and, simultaneously, the signal processing circuit 104 is in a normal state. When the voltage switching signal VSEL is at the L level, the movable contact of the switch SW5 selects the fixed contact to which the reference voltage PWM signal is input.

Because the two-wire transmitter 100 according to the embodiment illustrated in FIG. 8 includes the abnormal state detection circuit, in a case in which the signal processing circuit 104 enters an abnormal state, the two-wire transmitter 100 can perform burnout of the current signal output by the current output circuit 106 in accordance with the abnormal state.

Although the present disclosure has been described based on the figures and the embodiments, it should be appreciated that those who are skilled in the art may easily perform variations or alteration based on the present disclosure. Accordingly, such variations and alterations are to be included in the scope of the present disclosure. For example, the functions included in each of the constituent elements or steps may be rearranged avoiding a logical inconsistency, such that a plurality of constituent elements or steps are combined, or one constituent element or step is subdivided.

The invention claimed is:

1. A two-wire transmitter that is connected to an external circuit via two transmission lines and outputs a current signal to the external circuit while using the external circuit as a power source, the two-wire transmitter comprising:
   a measured data processing circuit that is connected to a sensor configured to output an electrical signal based on measured data and includes an output terminal configured to output a first signal based on the measured data;
   a current output circuit configured to determine the current signal based on the first signal; and
   a shunt regulator circuit configured to determine a circuit voltage of the two-wire transmitter based on the first signal,
   wherein the first signal is output from the output terminal and is branched off and is input into both of the current output circuit and the shunt regulator circuit,
   wherein the measured data processing circuit includes a signal processing circuit configured to process the electrical signal and output a control signal, and a first signal generation circuit configured to output the first signal based on the control signal,
   wherein the control signal includes a Pulse Width Modulation (PWM) signal controlled based on a PWM method, and
   the first signal generation circuit includes a Low Pass Filter (LPF), converts the PWM signal into the first signal, and then outputs the first signal.

2. The two-wire transmitter according to claim 1,
   wherein, the more the current output circuit reduces the current flowing as the current signal based on the first signal, the more the shunt regulator circuit increases the circuit voltage based on the first signal.

3. The two-wire transmitter according to claim 1,
   wherein the measured data processing circuit includes an abnormal state detection circuit.

4. The two-wire transmitter according to claim 2,
   wherein the measured data processing circuit includes an abnormal state detection circuit.

5. A two-wire transmitter that is connected to an external circuit via two transmission lines and outputs a current signal to the external circuit while using the external circuit as a power source, the two-wire transmitter comprising:
   a measured data processing circuit that is connected to a sensor configured to output an electrical signal based on measured data and includes an output terminal configured to output a first signal based on the measured data;
   a current output circuit configured to determine the current signal based on the first signal; and
   a shunt regulator circuit configured to determine a circuit voltage of the two-wire transmitter based on the first signal,
   wherein the first signal is output from the output terminal and is branched off and is input into both of the current output circuit and the shunt regulator circuit,
   wherein the measured data processing circuit includes a signal processing circuit configured to process the electrical signal and output a control signal, and a first signal generation circuit configured to output the first signal based on the control signal,
   wherein the control signal includes a digital signal, and
   the first signal generation circuit includes a Digital to Analog (DA) converter, converts the digital signal into an analog signal, and then outputs the analog signal as the first signal.

6. The two-wire transmitter according to claim 5,
   wherein, the more the current output circuit reduces the current flowing as the current signal based on the first signal, the more the shunt regulator circuit increases the circuit voltage based on the first signal.

7. The two-wire transmitter according to claim 5,
   wherein the measured data processing circuit includes an abnormal state detection circuit.

8. The two-wire transmitter according to claim 6,
   wherein the measured data processing circuit includes an abnormal state detection circuit.

\* \* \* \* \*